INVENTOR
HARRY J. NICHOLS

April 5, 1955

H. J. NICHOLS 2,705,537

DIFFERENTIAL ANGLE INDICATING AND CONTROLLING
SYSTEM FOR VARIABLE PITCH PROPELLERS

Filed Oct. 29, 1947

INVENTOR

HARRY J. NICHOLS

BY *J. Harold Kilcoyne*

ATTORNEY

United States Patent Office 2,705,537
Patented Apr. 5, 1955

2,705,537

DIFFERENTIAL ANGLE INDICATING AND CONTROLLING SYSTEM FOR VARIABLE PITCH PROPELLERS

Harry J. Nichols, Point Pleasant, N. J.

Application October 29, 1947, Serial No. 782,869

2 Claims. (Cl. 170—160.22)

This invention relates generally to a system for the precise indication and control of the differential angle of two rotary members normally in rotation, and more particularly to variable-pitch propeller blade pitch-angle indicating and controlling systems of the electrical class.

In the precision control of the relative angle of a rotary member which is located on a rapidly revolving shaft and/or at a remote location where it is not directly observable to the operator of the controls, as for example in the control of the pitch of controllable reversible pitch (CRP) propellers, it is highly desirable to provide a "double-sensory" control system. That is, a control system whereby the operator can "feel" the rate of the application of control, as well as see, by means of an angle indicating device, the result of such application. Such a "double-sensory" control system promotes the development of a high degree of skill on the part of the operator in exercising precision control.

Angle indication systems have in many instances used an electrical transmitter having a rotary element and one or more electrical receivers having similar rotary elements connected electrically so that the rotary elements of the receivers follow any change in angular position of the rotary element of the transmitter. However, if the rotary element of the transmitter is turned too quickly, or is driven at too high a speed, the rotary element of a receiver may slip behind that of the transmitter, causing loss of calibration.

In some instances, differential angle indication is desired, that is, indication of the relative angle of two rotatable or rotating shafts. This usually requires two electrical transmitters controlling jointly an electrical differential device. This complicates the indicating system, particularly where remote indication at a plurality of stations is required. And as before, excessive acceleration or speed of the transmitter rotary element is liable to result in slippage of the rotary element of the differential device and of the receivers, with consequent loss of calibration of the system.

In some applications, it is desirable to limit the actuated rotary member to certain predetermined angular limits. For example, in the application of powerful pitch control mechanism to controllable reversible pitch (CRP) marine propellers, the pitch limiting device should terminate the power input when the predetermined pitch limits are approached. Were it attempted merely to stop the blades mechanically at certain angular limits, the resulting undue multiplication of the applied pitch changing torque might cause damage to the pitch changing mechanism.

It is therefore one of the principal objects of the present invention to provide a novel "double-sensory," precision angle control system which overcomes the disadvantages and drawbacks recited above by providing a manual sensory speed controlling element in addition to visual indication of the relative angle of the controlled rotary member, in combination with a motor speed control system characterized by a highly variable rate and wide range of motor speed control.

Another object is to provide a flexible motor speed control system characterized by reliability, practicality, operating economy, and facility of speed control.

A further object is to provide an angle control system in which the intuitive manual skill of the operator is made effective to aid in manipulating a motor driven machine, thereby to gain greater precision, quickness and certainty of result than has been possible with comparable control systems of the prior art.

Another of the principal objects of the invention is to provide a differential angle indicating system capable of indicating rapid angular changes of wide range with infallible accuracy and reliability at a plurality of remote stations.

Another object is to provide a differential angle reducing device which for purposes of angle indication reduces the variable differential angle of two rotary members by a large ratio, say by a ratio of 100:1, thereby to facilitate the electrical transmission of differential angle indications of rapid rate and large degree.

Another object is to provide an angle limiting device which operates to terminate the application of input power in a manner which prevents trespass beyond either established limit of a predetermined angular range, while permitting the application of input power in a manner to change the angle in a direction towards the limit not in danger of trespass.

A further object is to provide a complete electrical pitch indicating and pitch controlling system particularly adapted to the requirements of controllable reversible marine propellers.

The present invention is described with reference to its application to a pitch control system for controllable reversible pitch propellers for large marine vessels, such as ships.

With these and other objects in view, as well as other advantages incident to the improved construction, the invention consists in various novel features and combinations thereof set forth in the claims with the understanding that the several necessary elements constituting the same may be varied in proportion and arrangement without departing from the nature and scope of the invention as defined in the appended claims.

To enable others skilled in the art to comprehend the underlying features of this invention that they may embody the same by suitable modifications in structure and relation to meet the various practical applications contemplated by the invention, drawings showing a preferred embodiment of the invention form part of this disclosure, and in such drawings like characters of reference denote corresponding parts in the several views in which:

In the control of the pitch of CRP propellers for marine vessels, numerous unusual difficulties must be overcome for satisfactory results. The propeller whose pitch is to be controlled is mounted on a normally rotating shaft and is located in a submerged position outside the vessel where it is neither visible nor readily accessible. The pitch of a propeller must for good results be controlled much more precisely than is obvious, or has apparently heretofore been appreciated. For example, suitable calculations show that a change of pitch angle of one degree may change the speed of a vessel by two or three knots. Unsatisfactory results which have been experienced in some instances in experimental installations of controllable pitch marine propellers have been attributed to the lack of adequate and accurate control of the pitch of the blades.

Consider next the matter of rate of change of pitch. For a small change of pitch, that is a change of a few degrees, it is obvious from the foregoing that a very slow change of pitch in connection with an accurate pitch indicator will materially facilitate attaining the necessary precision of pitch setting. This means in practice a very slow relative speed for the motor driving the pitch changing mechanism. But in an emergency it may be desirable to change the pitch very rapidly, say from full-ahead to full-reverse in 5 seconds. This means in practice a high relative motor speed.

A flexible control system of great precision and wide range of speed control is therefore highly desirable for the control of the pitch of CRP propellers. The salient features of such a control system are, for the purpose of the invention, a variable-speed reversible motor; a flexible motor speed control system including a manual motor controlling member whose position indicates the direction and rate of motor control and which requires more manual effort, even tho slightly more, to increase the rate of control; a visual angle indicating system capable of showing precisely the angular displacement of the member ultimately controlled; and means operatively associated with the motor control means for limiting the angular displacement of the ultimately controlled member.

It will be evident from the following description that these features are distinguishing characteristics of the novel angle indicating and controlling system of the invention.

General description

Figure 1:
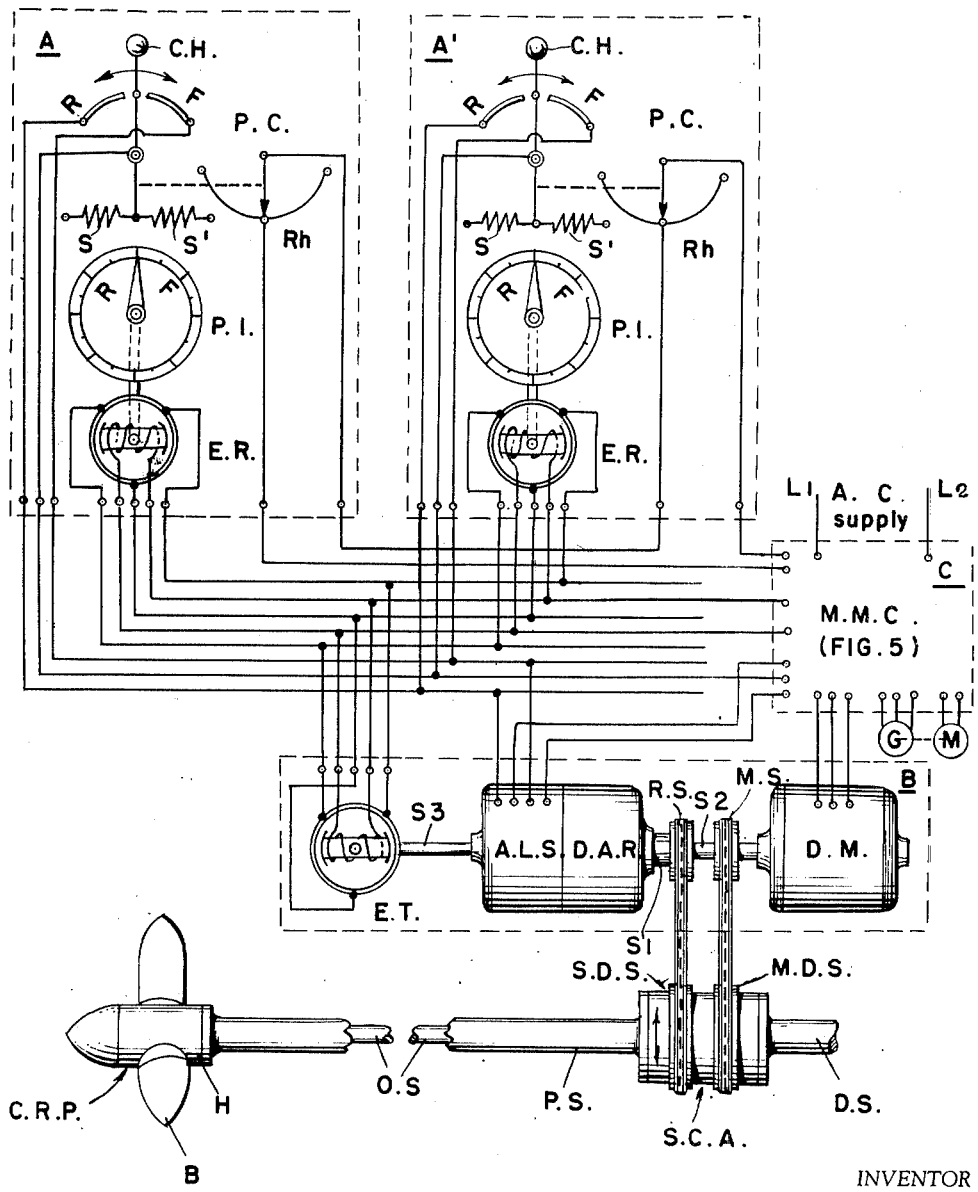
Fig. 1 is a schematic diagram of the angle indicating and controlling system of the invention illustrated by way of example in its application to controllable reversible pitch propellers.

Referring now to the diagram of Fig. 1, which shows schematically by way of illustration a CRP propeller system embodying the invention, the motor DM is the driving motor whose direction of rotation and speed are to be controlled at will by proper manipulation of any of the manual remote control handles CH. In the example shown, motor DM is preferably a split-field, reversible DC series motor; that is a motor having two fields of opposite magnetic effect adapted to be connected alternatively in series with the armature for purposes of reversing the direction of rotation of the armature. The driving motor DM is of course mounted in driving relation to the load. In this case, the motor DM is provided with a sprocket MS connected by a roller chain to drive a sprocket MDS mounted on the shaft coupling assembly SCA for purposes of pitch adjustment. The motor station is designated as station B. When the pitch is not being changed, which is the normal condition, the armature of motor DM is rotated idly, say at half-speed, by sprocket MDS and the associated roller chain; due to static friction of the pitch adjusting mechanism carried by the propeller shaft P. S. and the shaft coupling assembly S. C. A.

Figure 5:
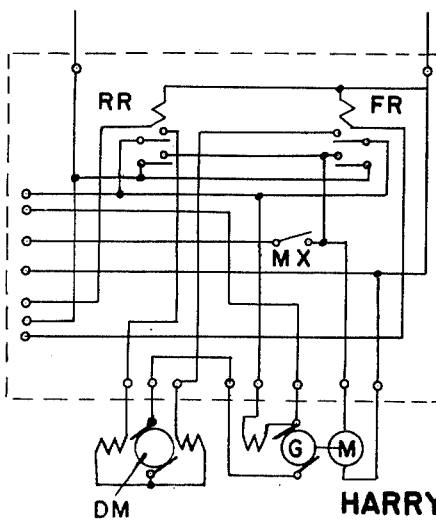
Fig. 5 is a schematic diagram illustrating typical magnetic motor control circuits suitable for use with the other apparatus of the invention.

For purposes of remote pitch control, the following apparatus is mounted at the remote control stations A, A': A pitch controller PC comprising control handle CH, contact segments F and R, neutral bias springs S and S', generator field control rheostat Rh linked mechanically to control handle CH; and a visual pitch indicator PI, as hereinafter described. Suitable intermediate switching apparatus MMC, commercially termed a magnetic motor controller, is operatively connected intermediate pitch controller PC and the power carrying circuits, thereby to avoid switching large currents by the former unit. A schematic circuit diagram of motor controller MMC, which includes forward relay FR, reverse relay RR, and motor switch MX, is shown in Fig. 5.

Motor DM is supplied with current widely varying and closely controllable voltage, preferably by a start-stop motor-generator set comprising a motor M of constant-speed type directly connected mechanically in driving relation to generator G, of D. C. series type as shown in Fig. 5. When the control system is not being manipulated, which in practice may be 95% or more of the time, motor M is normally cut off from its power supply, hence there are no stand-by power losses. Furthermore, when power is applied to motor M, an appreciable time elapses before the motor comes up to full speed and, in the interim, the voltage generated by series generator G is rising from zero to a value determined by the position of the control handle CH. It should also be noted that in starting, motor M is required only to accelerate itself and generator G, hence it can accelerate its speed quite rapidly. This gradual application of voltage to driving motor DM provides very slow and smooth starting, if desired, yet provides steadily increasing torque, such as may be required to start heavy loads, as in pitch control.

For frequent or continuous duty, however, motor M may be kept normally running by closing switch MX. These alternative operating conditions for motor M are optional so far as the invention is concerned, the speed control of motor DM being substantially independent of such conditions.

The series field of generator G is shunted by rheostat Rh, which rheostat is ganged with and actuated by "sensory" manual control handle CH. This handle is maintained normally in neutral position by neutral biasing springs S and S'. Control handle CH is adapted to contact with forward running segment F, or with reverse running segment R, as selected by the operator. Rheostat Rh has a center tapped, arcuate resistance winding, and the contactor arm thereof is so ganged with handle CH that the shunt resistance across the series field of generator G is progressively increased in either direction of movement, thereby limiting the voltage which can be generated by generator G at any position of handle CH. Thus, as handle CH is moved away from neutral, current is increasingly diverted into the series field of generator G. In short, the maximum voltage which can be generated by generator G is controllable at will by the operator through operation of handle CH; and consequently the voltage applied to motor DM, up to the maximum voltage of generator G, is likewise controllable.

It is to be noted further that the rate of application of increasing voltage to motor DM is controllable by the rate of operation of handle CH. For if handle CH is thrown at once to the full F or R position, the resistance of shunt field rheostat Rh is increased rapidly to the maximum and the generator voltage builds up with maximum rapidity.

The "sensory" manual control effect appreciated by the operator of handle CH is that the handle normally tends to remain in neutral position, but yields with steadily increasing mechanical resistance when displaced towards the extreme F or R position. Consequently, since motor DM is accelerated or de-celerated proportionally to the rate of travel of handle CH, the operator is provided with a sensory coordination of the speed of operation of handle CH with the acceleration and speed of motor DM. This is analogous to the well known "accelerator feel" which contributes so greatly to the ease of control of the speed of an automobile.

Angle indicating system

Referring again to the schematic diagram shown in Fig. 1, the rotary members whose differential angle is to be remotely indicated for purposes of pitch control are propeller shaft PS, connected in driven relation to a coaxial drive shaft DS by a shaft coupling assembly SCA, and a motor driven sprocket MDS rotatably mounted on said shaft coupling assembly. Suitable mechanism, not part of the present invention but driven by sprocket MDS, is mounted in the shaft coupling assembly SCA so as to actuate an operating shaft OS mounted coaxially in the bore of the propeller shaft PS. Operating shaft OS extends into the hub H which contains suitable mechanism to vary the pitch of the propeller blades B responsively to actuation of shaft OS by relative rotation of motor driven sprocket MDS.

The differential angle of rotary member MDS and propeller shaft PS therefore represents the pitch angle of the propeller blades at all times. Thus, in effect, the pitch changing mechanism can be considered as a micrometer device in which a certain number of turns of the rotary member MDS relative to propeller shaft PS produces one degree of pitch change of the propeller blades.

A mechanical differential angle reducer unit DAR, described in detail hereinafter, is mounted on the same base as motor DM, the shafts of these two units being in alignment as shown. The motor shaft is suitably coupled directly to the inner shaft S2 of the two coaxial input shafts of unit DAR. The propeller shaft PS is also provided with a shaft driven sprocket SDS, rotatably connected by means of a transmission chain as shown to a reducer sprocket RS fixed on the outer input shaft S1 of DAR in driving relation thereto. The two chain-and-sprocket transmissions described are of equal ratio, so that when the rotary member MDS turns with propeller shaft PS, the two input shafts S1 and S2 of DAR are driven at the same speed. The output shaft S3 of DAR is coaxial with and in driving relation to pitch limit switch ALS, described hereinafter. The output shaft S3 is also coupled in direct driving relation to the rotor of an electrical transmitter ET, which rotor thus turns with output shaft S3.

Electrical transmitter ET is of well-known type and is electrically connected to one or more remote electrical receivers ER, also of well known type, each located at a remote control station A, A', to form a self-synchronizing angle repeating system. Such angle repeating systems, variously known as selsyn, autosyn, diehlsyn, and synchro-tie systems, are in wide use; hence it will suffice to point out that the rotor windings of each rotor in the repeating system are usually provided with single-phase A. C. excitation, and the stators are wound and interconnected in polyphase relation. When electric power is applied to the rotors, they assume corresponding positions relative to their respective stators. Then if the rotor of the transmitter is turned, but not too rapidly, the receiver rotors all turn correspondingly.

At each remote control station A, A', etc., the rotor of electrical receiver ER is mechanically connected to a pointer swinging over a calibrated indicator dial of a pitch angle indicator PI. Thus angular indications representing directly the angular displacement of output shaft S3 of DAR are made available at each remote control station A, A', etc. Further, by choosing a suitable over-all speed ratio for the angle indicating system in correlation with the over-all speed ratio of the pitch changing mechanism, the dials at the remote stations can be calibrated in degrees of pitch angle of the propeller blades, thus indicating visually the pitch angle with a high degree of precision.

It should be noted here that the accuracy of angle transmission of the repeater link system comprising the electrical transmitter ET and any one of the receivers ER is of the order of $\pm 5°$. Hence, in order to keep the angle indications of pitch indicator PI within an accuracy of $\pm 1°$, the scale on the dial is spread so that an indicated angle of $60° = 300°$, say, on the dial. A small reduction ratio may also be provided in the electrical receivers ER between the rotor and the pointer, thereby further to increase the accuracy of the indication.

*Differential angle reducer device*

Figure 2:
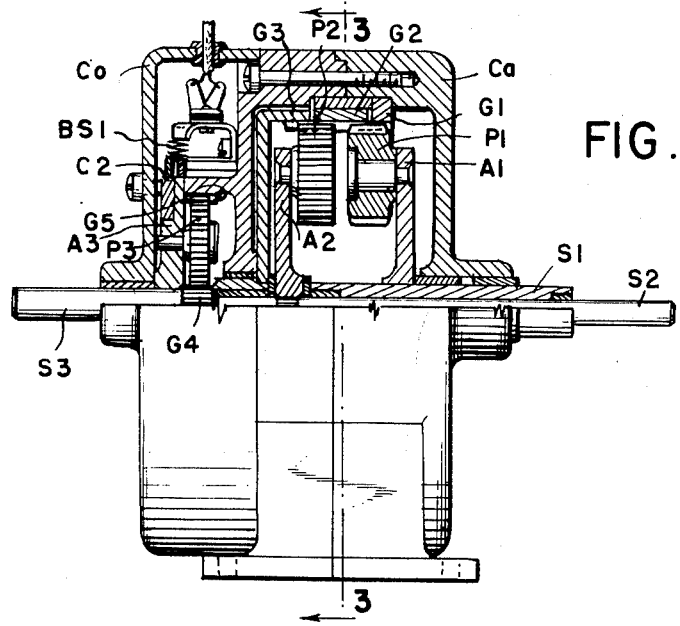
Fig. 2 is a longitudinal half-section view of a differential angle reducer and angle limit switch according to the invention.
Figure 3:
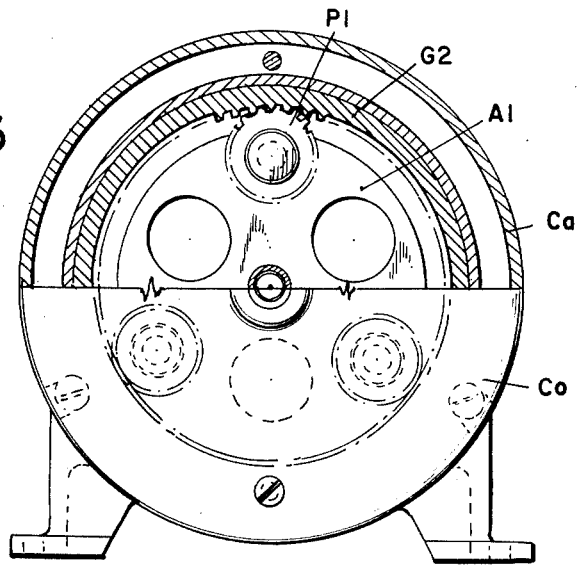
Fig. 3 is a transverse part section at plane 3—3 of Fig. 2.
Figure 4:
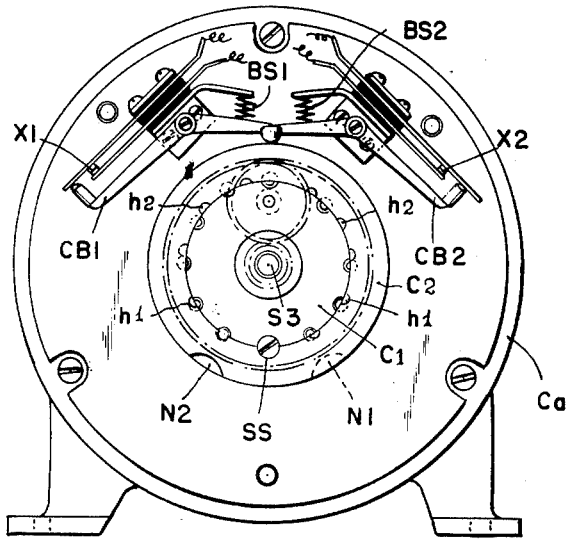
Fig. 4 is a left view of Fig. 2 with the end bell removed.

Referring now to Figs. 2 to 4, the device there shown combines in unitary form the differential angle reducer DAR and angle limit switch ALS, which devices are shown as adjacent units in Fig. 1. This combination unit comprises the double differential gearing of the differential angle reducer housed in a split casing Ca, and the angle limit switch mechanism housed in a separable end-bell or cover Co.

The outer input shaft S1 of DAR has fixed thereon planet carrier A1 on which double pinions P1 are rotatably mounted in meshing relation with fixed internal gear G1 and driven intermediate internal gear G2. The inner input shaft S2 has fixed thereon planet carrier A2 on which double pinions P2 are rotatably mounted. Pinions P2 mesh with intermediate gear G2 and driven internal gear G3, which latter is fixed on output shaft S3. Intermediate gear G2 thus operatively connects the two sections of epicyclic differential gearing.

The principle of operation of the double differential gearing is as follows:

The basic formula for simple epicyclic gearing of the type consisting of a driver gear, a follower gear, and an epicyclic arm carrying a planet pinion meshing with both gears is:

(1) $\qquad f = de + a(1-e)$ where $f$ = turns of follower gear of train
$d$ = turns of driver gear of train
$a$ = turns of planet carrier (arm)
$e$ = effect of gear members Considering first the gear train G1, P1, G2; in which the planet carrier A1 is driven directly by shaft S1, and letting G1, P1, and G2 represent the number of teeth in the respective gear members:

$a$ = turns of $A1$ = turns of $S1 = S1$
$d$ = turns of $G1 = 0$ ($G1$ being fixed)
$e = \dfrac{G1}{P1} \times \dfrac{P1}{G2} = (+)\dfrac{G1}{G2}; \quad 1 - e = \dfrac{G2-G1}{G2}$ (2) $\quad \therefore \quad f = \text{turns of } G2 = 0 + a(1-e) = S1\dfrac{(G2-G1)}{G2}$ Equation 2 is the operational formula of the first section of the differential gearing.

Considering next the gear train G2, P2, G3, in which the planet carrier A2 is driven directly by shaft S2 and gear G3 drives output shaft S3:

$a' = \text{turns of } A2 = \text{turns } S2 = S2$ $d' = \text{turns of } G2 = S1\dfrac{(G2-G1)}{G2}$ (by Eq. 2)

$e' = \dfrac{G2}{P2} \times \dfrac{P2}{G3} = (+)\dfrac{G2}{G3}; \quad 1-e' = \dfrac{(G3-G2)}{G3}$ By Eq. 1 $\quad f' = \text{turns of } G3 = d'e' + a'(1-e')$ $= S1\dfrac{(G2-G1)}{G2} \times \dfrac{G2}{G3} + S2\dfrac{(G3-G2)}{G3}$ (3) $\quad \therefore \quad f' = S1\dfrac{(G2-G1)}{G3} + S2\dfrac{(G3-G2)}{G3}$ Equation 3 is the operational formula of the second section of the differential gearing, including the effect of the first section.

If we now let $G3 = G1$, we can rewrite Equation 3 as:

$f' = S1\dfrac{(G2-G1)}{G3} + S2\dfrac{(G1-G2)}{G3}$ $= S1\dfrac{(G2-G1)}{G3} - S2\dfrac{(G2-G1)}{G3}$ (4) $\quad \therefore \quad f' = (S1 - S2)\dfrac{(G2-G1)}{G3} = S3$ where $S3$ = turns of output shaft S3

Equation 4 therefore represents the operational formula of the double differential gearing described above, and shows that when gears G1 and G3 are effectively equal, i. e. in diameter and number of teeth, the rotation of the output shaft S3 will be directly proportional to the differential rotation of the two input shafts S1 and S2.

As an example, by letting $G1 = G3 = 100$, and $G2 = 101$, we have by substituting in Equation 4:

(5) $\quad S3 = (S1 - S2)\dfrac{(G2-G1)}{G3} = (S1 - S2) \times \dfrac{1}{100}$

Hence it is seen that the double differential planetary gearing described operates to rotate the output shaft S3 according to the difference in the turns of the input shafts S1 and S2, but reduced by a constant ratio, in this case 100:1 as calculated in the example above.

*Angle limit switch*

Referring now to Fig. 2 in connection with Fig. 4, the planetary gearing of the angle limit switch comprises a sun gear G4 on shaft S3, a fixed internal gear G5 and a planet carrier A3 carrying one or more planet pinions P3. In this instance sun gear G4 is the driver member and carrier A3 is the driven member of the gearing.

Equation 1 applies as before, but since the turns of A3 are required, we transpose Equation 1 to:

(6) $\qquad a'' = \dfrac{f - de''}{1 - e''}$ $f$ = turns of $G5 = 0$ (fixed)
$d$ = turns of $G4$ = turns $S3$
$a''$ = turns of $A3$
$e''$ = train effect = $(-)G4/G5$ $1 - e'' = \dfrac{(G4+G5)}{G5}; \quad -de'' = S3 \times G4/G5$ (7) $\quad \therefore \quad a'' = S3 \times \dfrac{G4}{G4+G5}$ Equation 7, which is the operational formula of the gearing of the angle limit switch ALS, shows that carrier A3 turns at a fraction of the revolutions of output shaft S3. In practice, the number of relative teeth of G4 and G5 are chosen to restrict the operating rotation of A3 to somewhat less than one turn. For example, if $G4 = 15$ teeth and $G5 = 60$ teeth, the reduction ratio will be $(15+60)/15 = 5:1$, and A3 would then make one turn for 5 turns of output shaft S3.

Referring now to Fig. 4 which shows the switching device operated by the rotation of output shaft S3, two cam-lever circuit breakers are provided for actuation by planet carrier A3. The contacts of these circuit breakers are in series with the "forward" and "reverse" contact arcs of the switch PC in Fig. 1. Two edge cams C1 and C2 are mounted on carrier A3, one of which cams can be integral with A3 while the other is preferably angularly adjustable relative to A3. As shown, the operating lever of one circuit breaker CB1 rides on the circumference of the carrier A3 constituting fixed cam C1, while the operating lever of the other circuit breaker rides on the edge of adjustable cam C2. Each cam has a notch or drop designated as N1 and N2 respectively, located at the angular position where one or the other of the associated circuits is to be broken.

The preferred means for mounting cam C2 on A3 so as to be adjustable angularly to any desired degree is by means of a set screw SS and a series of evenly spaced tapped holes $h1$ in cam C1, as shown. Cam C2 is provided with similarly tapped holes $h2$, but one hole more or less than cam C1, these holes $h2$ being evenly spaced on the same pitch circle as the holes of cam C1. Hence by moving set screw SS from one set of holes to another, the relative position of the notches N1 and N2 in the two cams can be adjusted at any angle as desired.

It will thus be seen that when planet carrier A3 is rotated by output shaft S3 and the planetary gearing by a predetermined angle in one direction, one of the cam drops (say N1) will ultimately be brought under a breaker arm, whereupon a biasing spring BS1 causes that arm to drop and open its associated contacts X1. Likewise, upon rotation of S3 in the other direction, the other of the cam drops N2 will eventually be brought under its breaker arm, whereupon biasing spring BS2 causes that arm to drop and open the associated contacts X2. It is thus seen that convenient adjustable means are provided for opening the magnet control circuits at selectable predetermined angular limits, as may be desired in various applications.

Although in accordance with the provisions of the patent statutes, this invention is described as embodied in concrete form, it will be understood that the elements and connections shown and described are merely illustrative and that the invention is not limited thereto since alterations and modifications will readily suggest themselves to persons skilled in the art without departing from the spirit of this invention or from the scope of the annexed claims.

What is claimed is:

1. A propeller pitch control system comprising, in combination, a hollow propeller shaft, pitch changing mechanism carried by said propeller shaft including a rotary driven member concentrically rotatable with respect to said shaft whose differential angle relative to said shaft represents the propeller pitch, a reversible pitch changing motor mounted adjacent to said rotary driven member and having a rotary driving member positively connected to drive said rotary driven member in either direction of rotation relative to said shaft, control apparatus for said motor including a control member arranged to control the direction of rotation and speed of said rotary driving member in accordance with the direction and degree of displacement of said control member away from a normal off position, a pitch indicator device correlated with the aforesaid differential angle, means including a mechanical differential angle reducer jointly and positively driven by said motor and said propeller shaft and having an output shaft displaced angularly in reduced proportion to the aforesaid differential angle, means operatively connecting said output shaft and said pitch indicator device, and means driven by said output shaft and operatively associated with said control apparatus for limiting the change of propeller pitch to a predetermined range.

2. A propeller pitch control system comprising, in combination, a propeller shaft, pitch changing mechanism carried by said shaft including a driven rotary member coaxially rotatable with respect to said shaft in proportion to the pitch change, a reversible electric motor adjacent to and positively connected in driving relation to said pitch changing mechanism, a mechanical differential angle reducer having two input shafts and an output shaft rotatable in reduced proportion to the differential rotation of said input shafts, means positively connecting said rotary member to drive one of said input shafts, means positively connecting said propeller shaft to drive the other of said input shafts, angle repeating means positively driven by said output shaft, a remote pitch indicator actuated by said angle repeating means, and electrical control apparatus for said motor including switching mechanism positively driven by said output shaft and operatively associated with said control apparatus for limiting the change of pitch to a predetermined range.

References Cited in the file of this patent

UNITED STATES PATENTS

| | | |
|---|---|---|
| 1,719,574 | Vallen | July 2, 1929 |
| 1,933,630 | Koons | Nov. 7, 1933 |
| 2,221,324 | Goff | Nov. 12, 1940 |
| 2,337,613 | Martin | Dec. 28, 1943 |
| 2,370,167 | Hoover et al. | Feb. 27, 1945 |
| 2,381,991 | Symons | Aug. 14, 1945 |
| 2,389,350 | Exner | Nov. 20, 1945 |
| 2,429,642 | Newton | Oct. 28, 1947 |
| 2,432,550 | Waseige | Dec. 16, 1947 |
| 2,582,348 | Northrop et al. | Jan. 15, 1952 |

FOREIGN PATENTS

| | | |
|---|---|---|
| 493,032 | Great Britain | Sept. 30, 1938 |
| 848,267 | France | July 24, 1939 |
| 862,210 | France | Nov. 30, 1940 |

OTHER REFERENCES

"Controllable Pitch Propeller," J. H. Strandell, American Society of Naval Engineers Journal, vol. 52, 1940, Figs. 20, 23 and pp. 427–432.